Jan. 1, 1946.   J. W. BRYCE   2,392,224
OPTICAL RECORDER
Filed Sept. 16, 1942   8 Sheets-Sheet 1
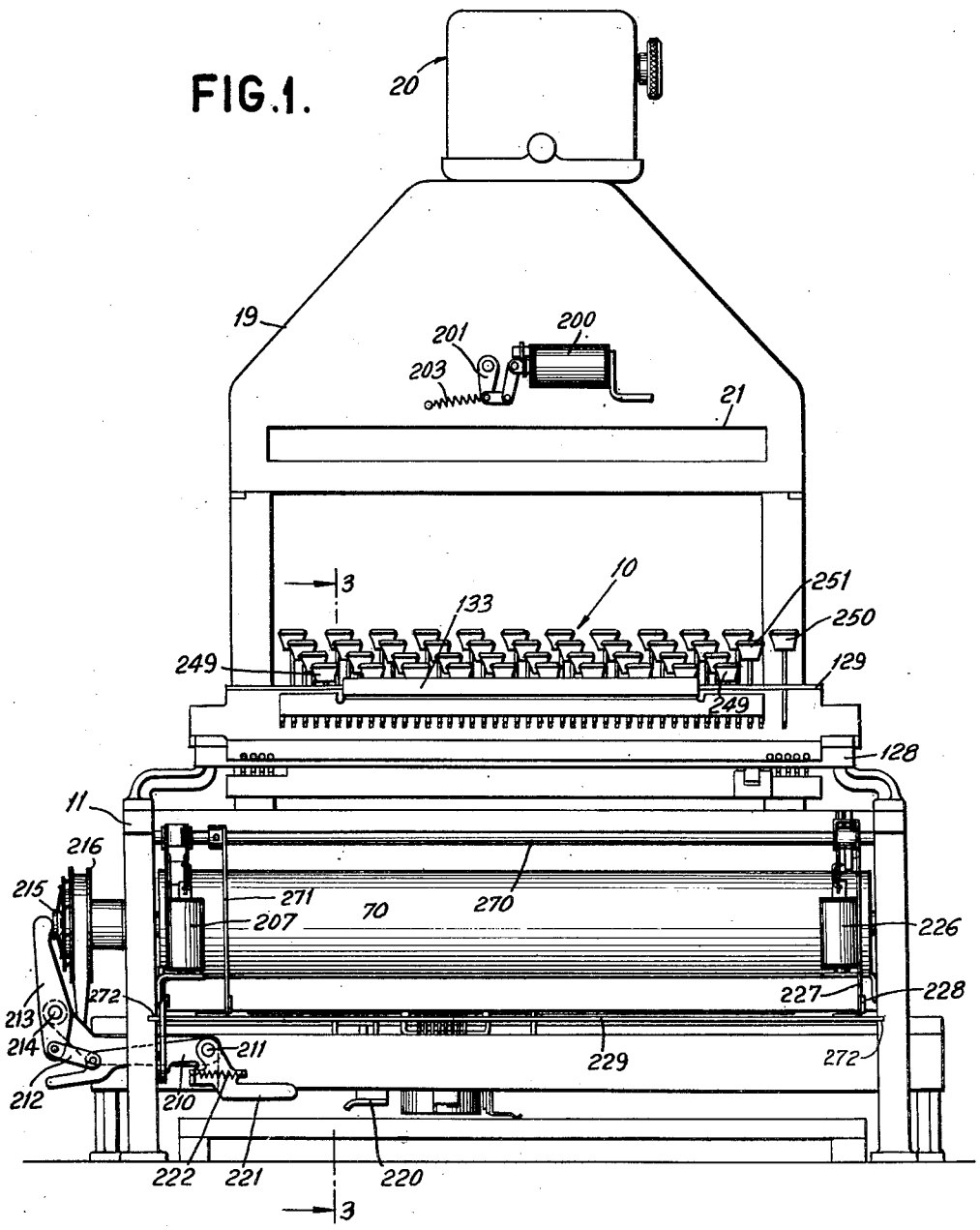
INVENTOR
James W. Bryce
BY
W. M. Wilson
ATTORNEY Jan. 1, 1946. J. W. BRYCE 2,392,224
OPTICAL RECORDER
Filed Sept. 16, 1942 8 Sheets-Sheet 2
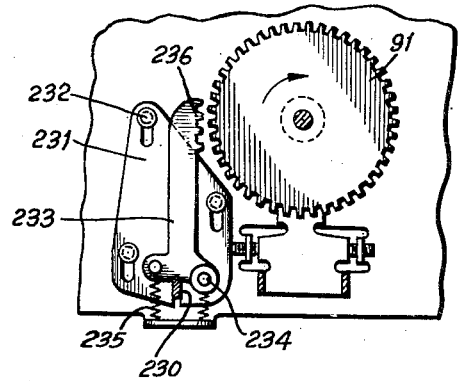
FIG. 8.
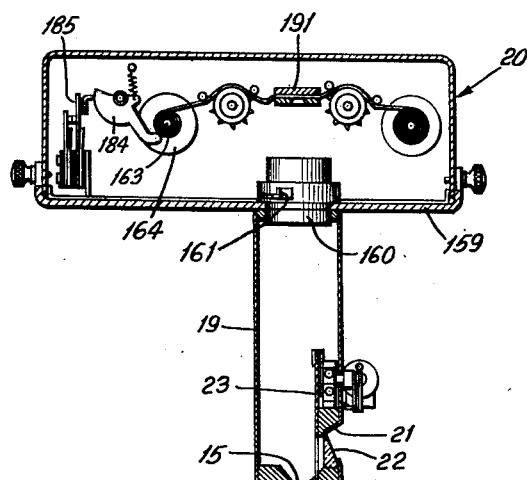
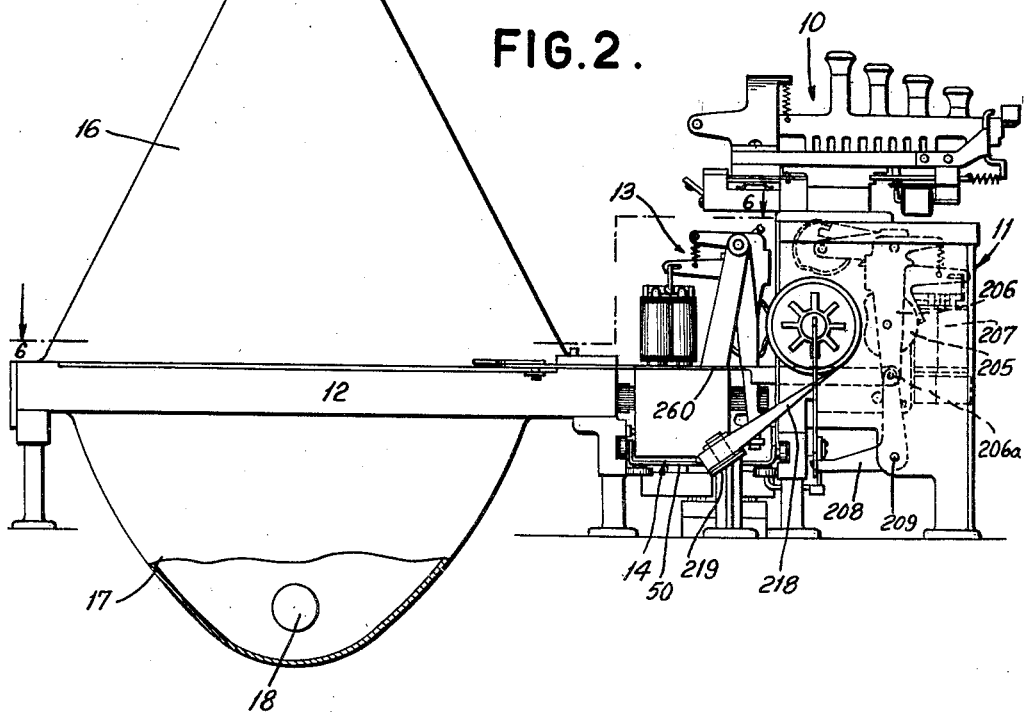
FIG. 2.
INVENTOR
James W. Bryce
BY
ATTORNEY

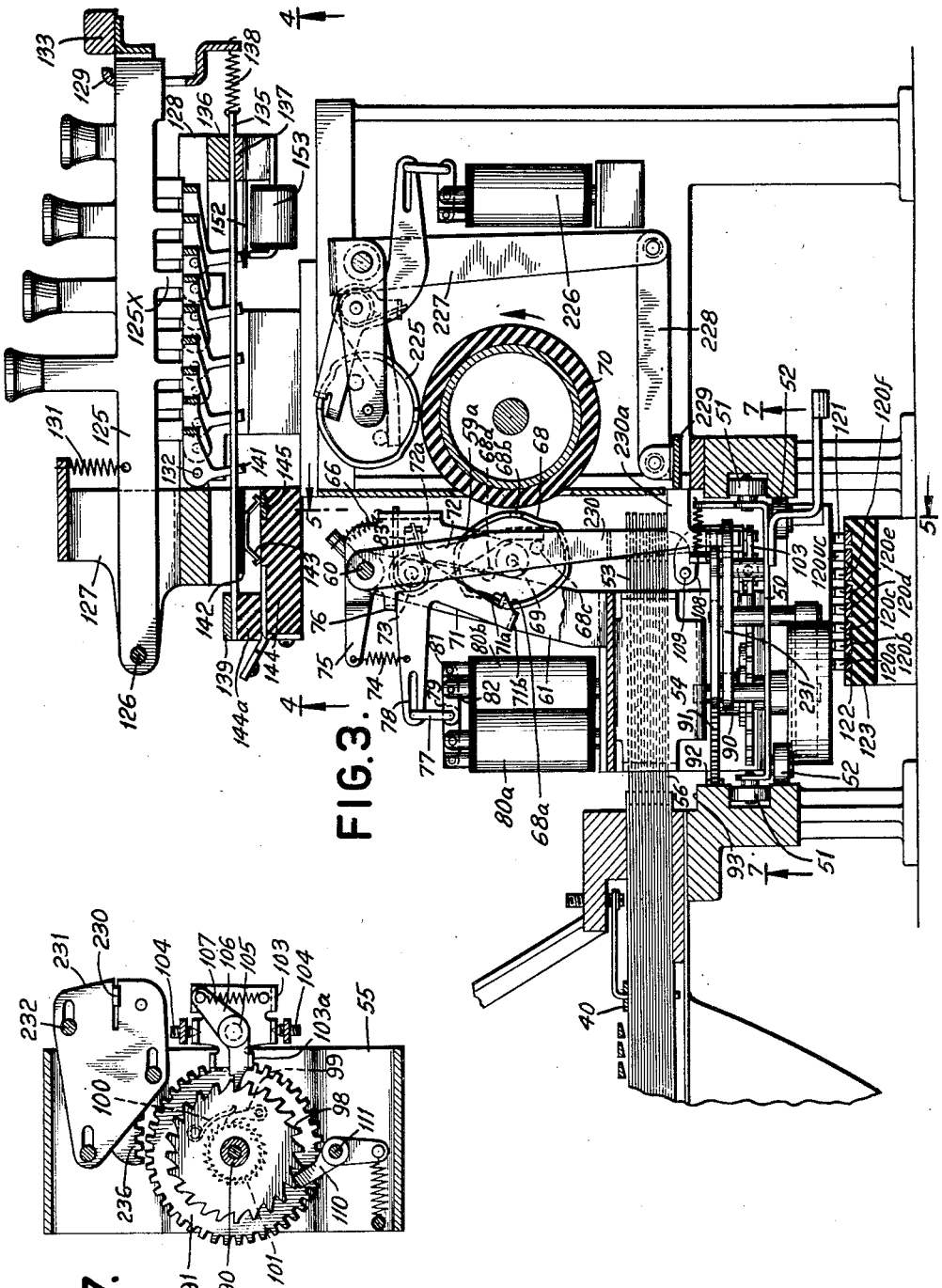

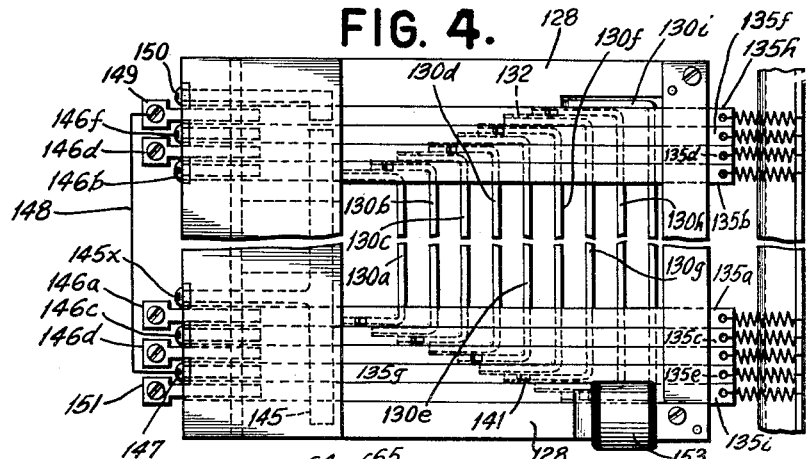
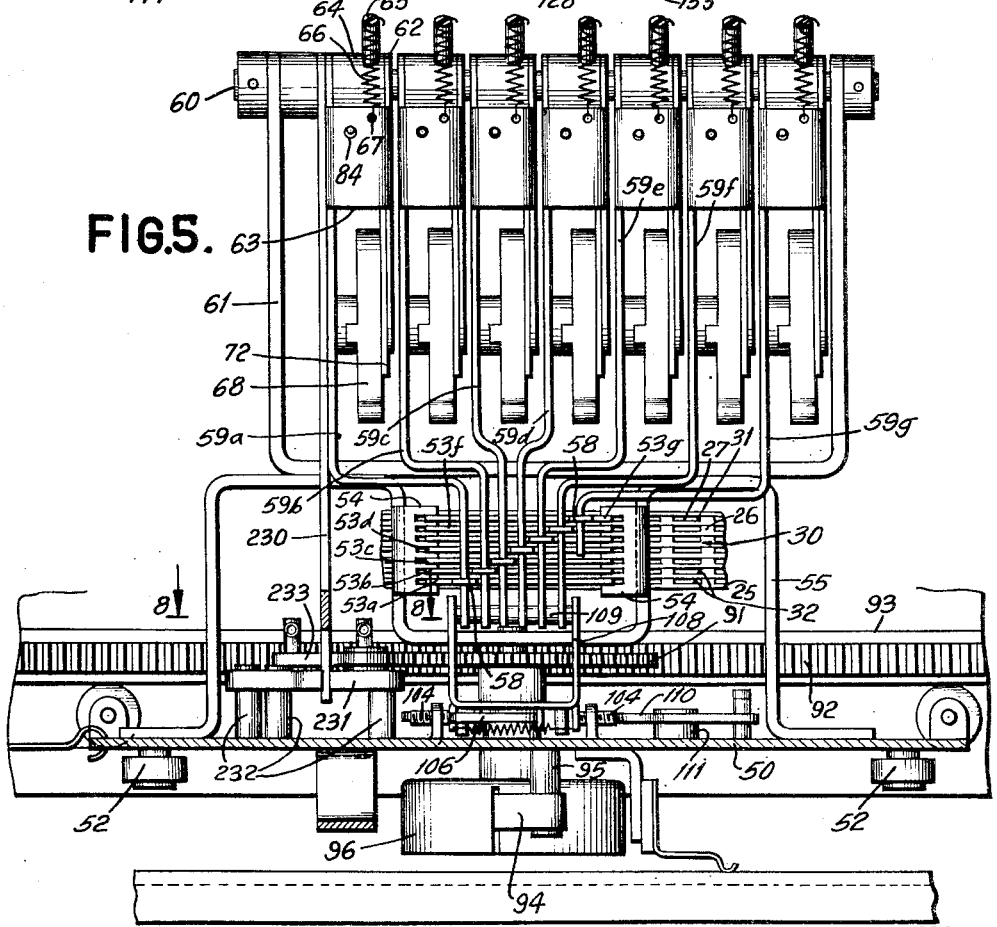

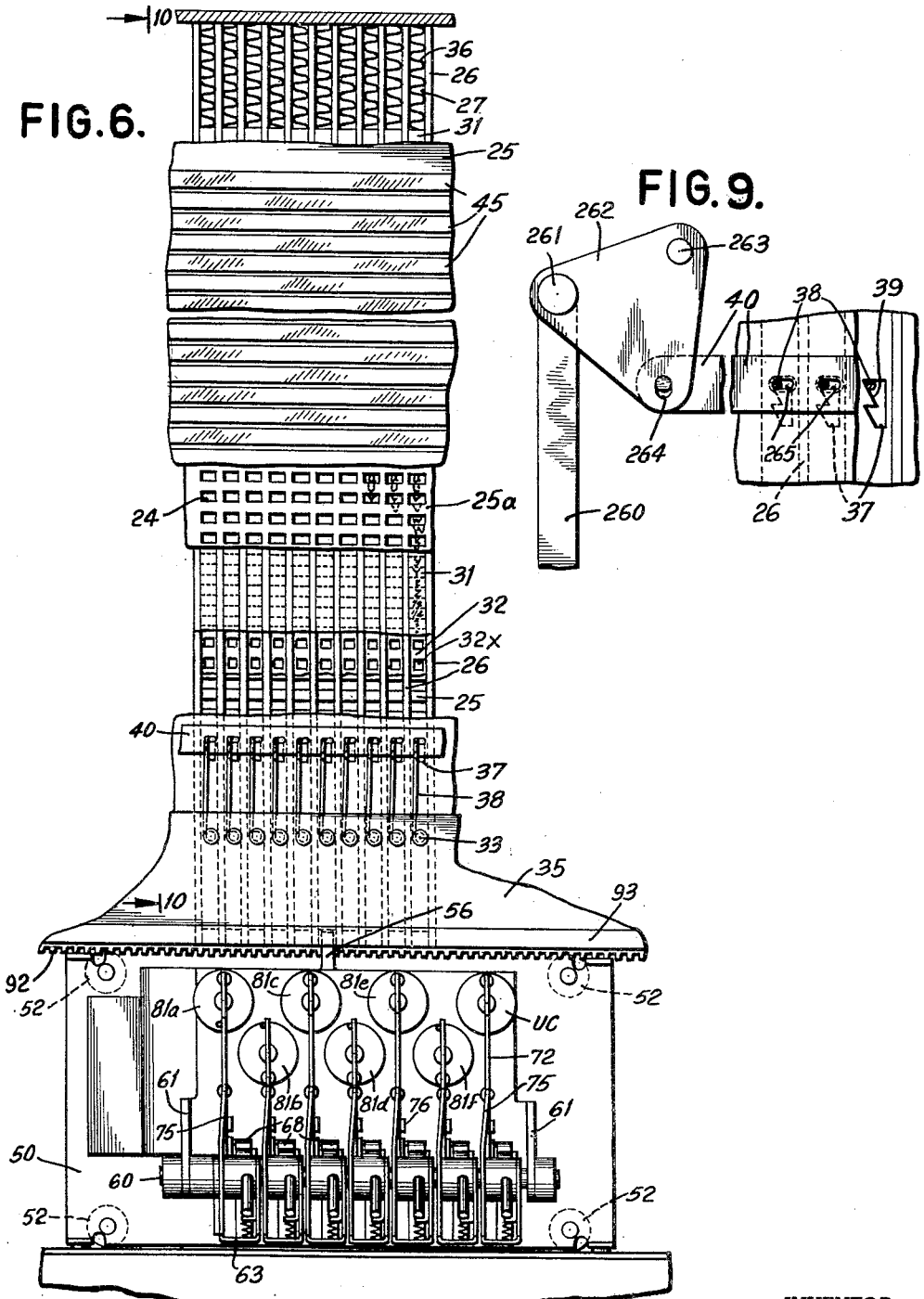

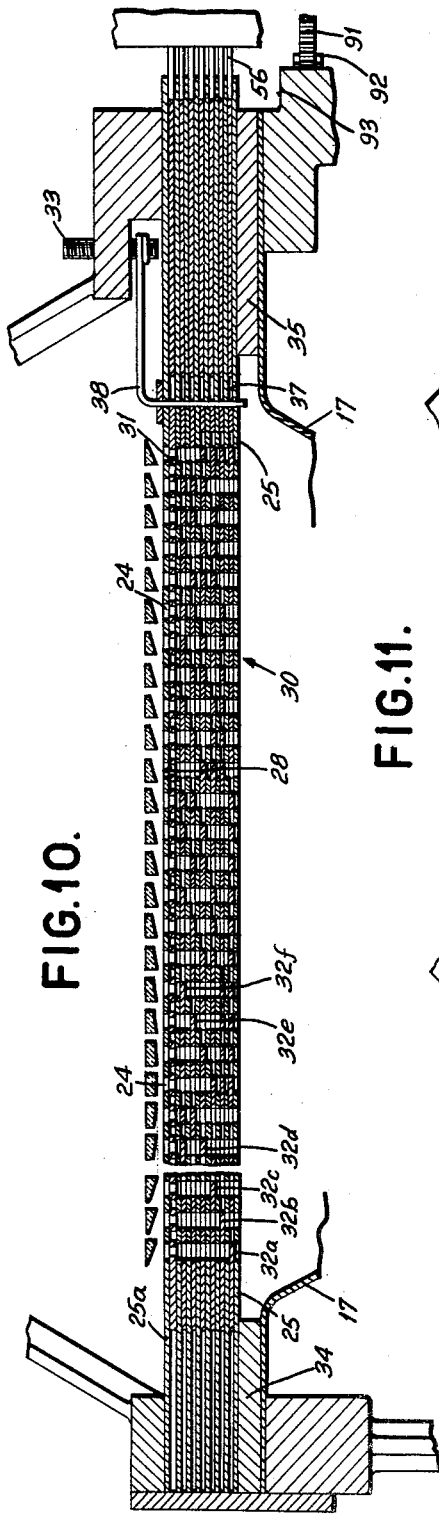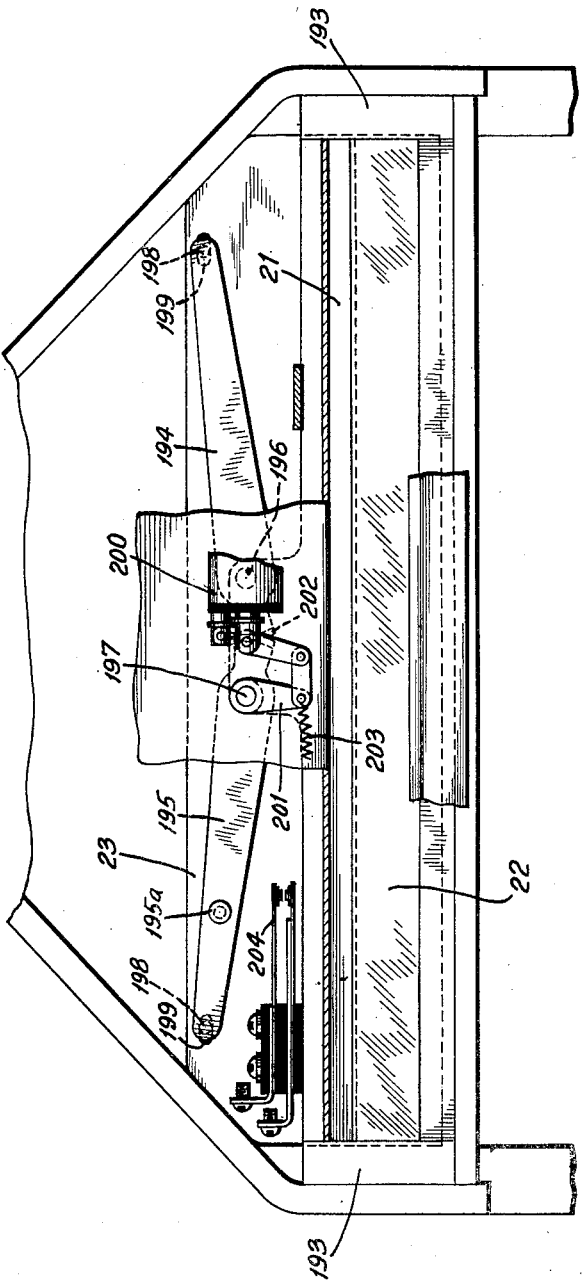

Jan. 1, 1946.　　　　　J. W. BRYCE　　　　　2,392,224
OPTICAL RECORDER
Filed Sept. 16, 1942　　　8 Sheets-Sheet 7
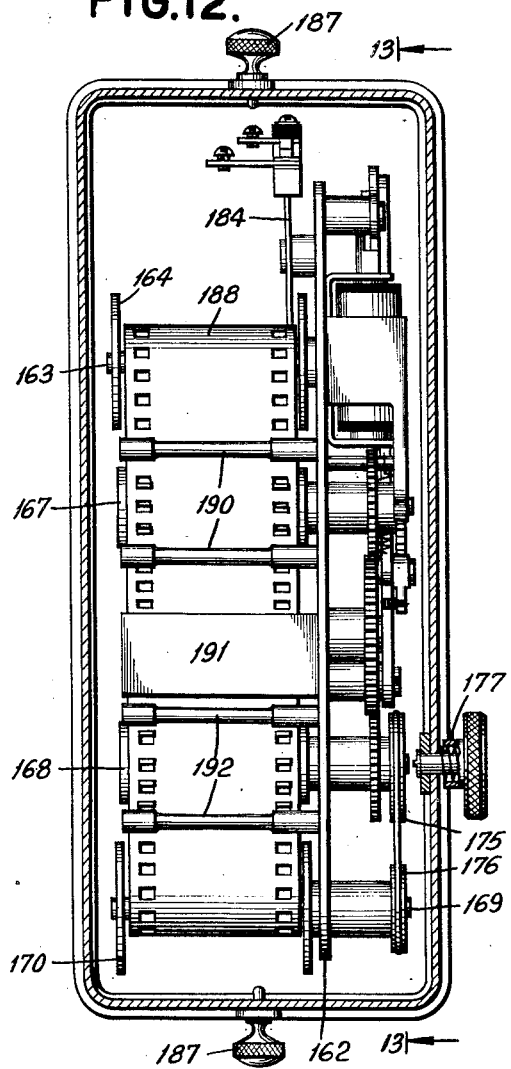
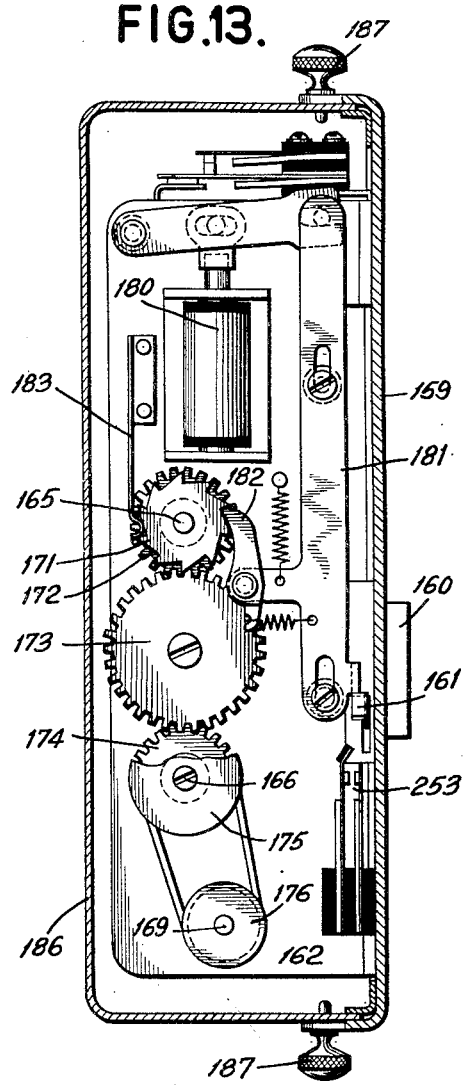
INVENTOR
James W. Bryce
BY
W. M. Wilson
ATTORNEY Jan. 1, 1946.   J. W. BRYCE   2,392,224
OPTICAL RECORDER
Filed Sept. 16, 1942        8 Sheets-Sheet 8

INVENTOR
James W. Bryce
BY
ATTORNEY

Patented Jan. 1, 1946

2,392,224

UNITED STATES PATENT OFFICE 2,392,224

OPTICAL RECORDER

James W. Bryce, Glen Ridge, N. J., assignor to International Business Machines Corporation, New York, N. Y., a corporation of New York Application September 16, 1942, Serial No. 458,513

5 Claims. (Cl. 95—85)

This invention relates to a photographic typewriting machine.

One object of the invention is to provide a typewriting machine by which a line of information can be set up for verification before recording, corrected if necessary, and then recorded.

A machine constructed in accordance with the principle of my invention is operated like an ordinary typewriter, except that the record is not made as the keys are struck, but after a whole line has been set up by operation of the keys, inspected, and corrected if necessary. The entire line is then recorded at once by photographic means.

A particular object of the invention is to provide a machine of the kind described by which corrections of single characters can be made with facility either during the operation of the keyboard or after an entire line has been set up.

Another object is to provide a machine of the character stated having stationary keyboard and recording mechanisms; the characters being set up one at a time as the keyboard is operated, by means of a progressively movable mechanism interposed between the keyboard and the recording mechanism.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a front elevation of a machine embodying the invention.

Fig. 2 is a side elevation of the machine with parts of the casing broken away.

Fig. 3 is a vertical section through a part of the machine on the line 3—3 of Fig. 1.

Fig. 4 is a horizontal section on the line 4—4 of Fig. 3 showing a bottom plan view of the keyboard, reduced in width by removal of a central portion thereof.

Fig. 5 is a vertical section on the line 5—5 of Fig. 3.

Fig. 6 is a horizontal section on the line 6—6 of Fig. 2.

Fig. 7 is a horizontal section on the line 7—7 of Fig. 3 showing the escapement mechanism.

Fig. 8 is a section on the line 8—8 of Fig. 5 showing a part of the back spacing mechanism.

Fig. 9 is a detail view on a large scale of a portion of the mechanism for releasing the character setup units.

Fig. 10 is a vertical section on the line 10—10 of Fig. 6 taken longitudinally through one of the character setup units.

Fig. 11 is an elevational view of a portion of the casing near the recording unit, showing the verifying window and its shutter operating means.

Fig. 12 is a horizontal section through the photographic recording unit.

Fig. 13 is a vertical section on the line 13—13 of Fig. 12.

Figure 14:
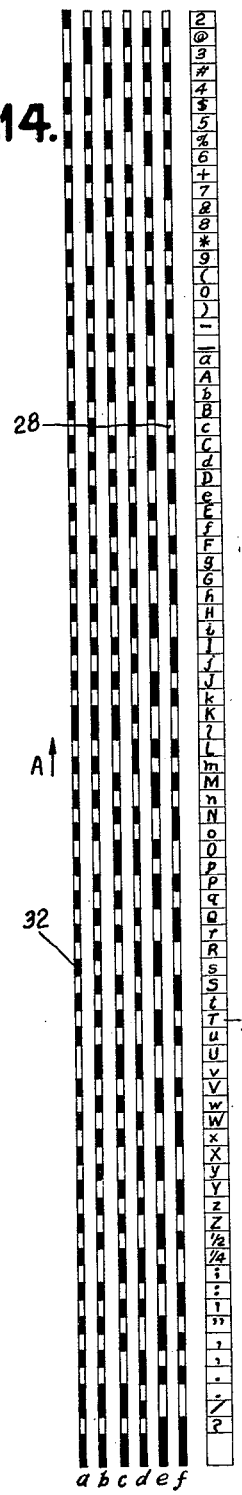
Fig. 14 is a diagram of the permutation or shutter slides and the character slide of one of the setup units.

The general arrangement and principal parts of the machine will first be described by reference to Figs. 1 and 2. A keyboard 10 is stationarily mounted upon a frame 11 behind which is located a character setup mechanism 12. The latter is operated by a setting mechanism 13 mounted on a carriage 14 having a rolling support upon the rear portion of the frame. The character setup mechanism comprises a plurality of similar, independent units, each capable of setting up any one of the whole complement of characters which may be used to compose the record. There is a unit for each letter space across the record and the setting mechanism acts upon them individually, one after another as the keys are struck, to set up corresponding characters. The character setup mechanism projects a line of character images upon a translucent screen 15, which may be an elongated strip of ground glass. Between the character setup mechanism 12 and the screen 15 is an inverted hopper-shaped casing 16 which excludes all light from the screen 15 except that transmitted through the character setup mechanism 12 by a light source comprising a tubular lamp 18 located at the focal line of a trough-shaped parabolic reflector 17. The casing extends above the screen 15 in the form of a narrow box 19, upon the top of which is mounted a photographic recording unit 20.

In the front side of the casing 19 is an elongated verifying window 21, in which is positioned a prism 22. The window is closed by a shutter 23 during the recording by the camera 20 of the image on the screen 15, but at other times the shutter is raised and the screen can be viewed through the window 21.

The machine is operated similarly to an ordinary typewriter, except that the characters are not recorded as the keys are struck, but are set up for verification of a complete line through the window 21 and then recorded, any necessary corrections being made before the recordation. During the setting up operation, the shutter 23 is raised and the operator can observe the characters as they appear on the screen 15 and correct errors as they occur. Alternatively, the operator can complete a line and then verify it through the window 21, making any necessary corrections and then recording the line by operating the shutter of the camera.

Character setup mechanism

Referring now to Figs. 5, 6, 10 and 14, each unit 30 of the character setup mechanism consists of a pack of slides, namely, a character slide 31, and six shutter slides 32 individually identified by the suffixes a, b, c, d, e and f. The slides are guided and supported in a framework comprising a stack of eight window plates 25 which extend across the full width of the setup mechanism. The upper sides of the plates 25, except the top plate 25a, have milled slots 27 separated from each other by ribs 26 and forming individual channels for the slides 31 and 32. The slides have free longitudinal movement in these channels. At the rear end of the slides there are individual, serpentine, compression springs 36 which bias them to a forward limit position determined by the abutment of one end of a slot 37 in each slide against the downwardly extending end of a spring wire detent 38. The detents 38 are supported by screws 33 upon a frame member 35, and there is one detent for each unit of the setup mechanism. The frame member 35 supports the front end of the window plates 25, while the rear end is held in a frame member 34.

The window plates 25 have rows of windows 24 along the channels 27, the windows of the superimposed plates being vertically aligned to form a series of light transmitting apertures 28 for each unit of the setup mechanism. The character slides 31 are all identical and are opaque, with transparent areas in the forms of the different characters distributed along their length. Such a slide can be made of a transparent plastic suitably imprinted with an opaque coating on the background areas, defining transparent uncoated areas in the forms of the characters. The characters are of two groups alternately distributed along the slide. One group, the lower case characters, are aligned with the apertures 28 when the character slide is in normal position; while the other group, the upper case characters, are aligned with the apertures 28 when the character slide is set to the rear. The shutter slides 32 have specially positioned windows 32x, some of which are normally aligned with the apertures 28, while others are aligned with related apertures by setting the slide to the rear. From the diagram of the slides in Fig. 14, it can be seen that in each possible combinational setting of the shutter slides not more than one aperture 28 will be unblocked, to trans-illuminate the character aligned therewith. By varying the settings it is possible to set up any one of the characters. The arrow A indicates the direction in which the slides are shifted from their normal position shown. With all the slides in normal position no character is set up, and this is also true of the condition when shutter slides c, d, e and f are set, a condition utilized for a purpose to be referred to later.

Above the top window plate 25a is a panel of prisms 45 extending crossways of the slides. The cross section angles of the prisms are graduated, the prism on the axial plane extending through the lamp 18 and the screen 15 having parallel faces and the prisms to the front and to the rear of this plane having faces at progressively larger angles. The prisms bend the rays transmitted through the apertures of the setup units, in differing degrees, depending upon the distance of the prism from the aforesaid axial plane, so that all the images will be projected onto the screen 15 in a single line.

The setting mechanism

Referring now to Figs. 2, 3, 5 and 6, the carriage 14 comprises a bottom plate 50 on which are journalled two sets of rollers 51 and 52, which travel upon suitable guide flanges of the frame 11, to guide the carriage for movement along the row of character setup units. Mounted on the carriage at the level of the character setup slides is a group of seven interposer slides 53, individually identified by suffixes a, b, c, d, e, f, and g. These slides are guided in combs 54 which form part of a bracket 55 secured to the bottom plate 50 of the carriage. Each interposer slide has a rearwardly projecting tongue 56 to coact with the related shutter slide 32, or the character slide 31. The tongues 56 of all the interposer slides are vertically aligned so as to act at one time upon the slides of one setup unit. The interposer slides have also forwardly extending tongues 58 which are relatively staggered, as seen in Fig. 5. Each tongues 58 has a longitudinal slot to receive an actuating lever 59. These actuating levers are pivoted upon a common shaft 60 supported by a bracket 61 mounted on the bracket 55 and are individually identified by suffixes a, b, c, d, e, f, and g. Each actuating lever has a stabilizing arm 62 connected to it by a yoke 63. Between each lever 59 and its arm 62 there is located a collar 64 fixed to the shaft 60 by a screw 65, which extends out to provide an anchor for a spring 66. The other end of the spring is hooked into a hole 67 in the yoke 63 and tends to rock the lever 59 counterclockwise (Fig. 3).

Between the lower ends of the lever 59 and the related arm 62 an actuating cam 68 is revolubly mounted on a small shaft 69. The cam cooperates with a constantly running driving roller 70 in a manner familiar to those skilled in the electric typewriter art. The particular cams shown in this case are of the double type, that is, they make one-half revolution for each operation, the two halves of the cam periphery being identical. The cams are normally held in the inoperative position shown by a detent 71a of a stop lever 71, which stands in the path of a lug 68a on the cam 68. The lever 71 is rockably mounted upon a small shaft 73 extending across the space between the related lever 59 and its stabilizing arm 62. A small spring 74 anchored upon a rearwardly extending arm 75 of the lever 59 and hooked into the latch lever 71 normally holds the latch lever against a stop 76 on the operating lever 59. A link 77 hooked in a slot 78 of the latch lever 71 connects the latter to a lever 79 pivoted at 81 upon a solenoid 80. The lever 79 is connected to the armature 82 of the solenoid, so as to be moved downward by the armature when the electromagnet is energized. There are six solenoids 80 individually identified by the suffixes a, b, c, d, e, and f, associated respectively with the operating levers 59a to 59f, and a seventh solenoid UC associated in a similar manner with the operating lever 59g, which controls the character slide. The counterclockwise movement of the latch lever 71 when the related solenoid is energized releases the detent 71a from the lug 68a of the related cam 68 and places the detent 71b in the path of a second lug 68b. While the cam 68 stands in idle position, a starting lever 72 pivoted on the small shaft 73 is biased against a pin 68c of the cam 68 by a spring 83. One end of the spring extends into a hole in a lug 72a of the lever 72, while the other end of the spring extends through a hole 84 in the yoke 63. The spring tends to rock the lever 72 clockwise and, when the cam 68 is released, the lever 72 will turn the cam far enough to make contact with the driving roller 70. The resulting half turn of the cam against the driving roller rocks the related lever 59 clockwise and throws the corresponding interposer slide to the rear, setting the appurtenant shutter slide, or the character slide. During the rotary movement of the cam 68 by the roller 70 the second pin 68d swings out the lever 72 against the force of spring 83. The lever 72, urged by its spring 83 and bearing against the pin 68d, completes the movement of the cam after the latter leaves the roller 70, bringing the lug 68b against the detent 71b, and eventually against the detent 71a, when the lever 71 returns to normal position. The lever 59 is restored by the spring 66 and retracts the related interposer 53.

The carriage movement during the setting up operation is controlled by an escapement mechanism, which will be described with particular reference to Figs. 3, 5 and 7. A shaft 90 journalled in the bracket 55 and the bottom plate 50 has fixed to it a spur gear 91 meshing with a rack 92 on the face of one of the cross bars 93 of the frame. The lower end of the shaft 90 has fixed to it the inner end of a coil spring 94, the outer end of which is anchored to a stationary post 95 on the bottom plate 50. The spring is housed in a casing 96 fixed to the bottom plate 50. The carriage is pulled toward the right by the spring, its movement being controlled by an escapement mechanism comprising an escapement wheel 98 revolubly mounted on shaft 90. A pawl 99 pivoted on the escapement wheel 98 is held by a spring 100 in engagement with a ratchet wheel 101 fixed upon the shaft 90. The shaft 90, under influence of the spring 94 thus tends to rotate the escapement wheel 98 through the pawl 99 in clockwise direction as seen in Fig. 7. The movement is controlled by an escapement dog comprising a rocking plate 103 pivoted on center screws 104 and having pivoted thereon at 105 a free dog 106 biased in a clockwise direction by a spring 107. The end of the free dog 106 cooperates with the teeth of ratchet wheel 98 in one position of the rocking plate 103, while in another position of the rocking plate a fixed dog on the plate 103, directly above the free dog, stands in front of the adjacent tooth of the ratchet wheel. Standing up from the rocking plate 103 is a bail 108 having a universal bar 109 which stands behind the lower ends of the actuating levers 59a to 59f. The lever 59g does not coact with the universal bar. The operation of any actuating lever 59a to 59f will rock the plate 103 counterclockwise (Fig. 3), releasing the free dog 106 from the escapement wheel 98 and placing the fixed dog in front of the same tooth. The free dog thereupon swings to a position where it will move in front of the next tooth of the escapement wheel when the plate 103 rocks back to normal position. At this time the fixed dog moves out from in front of the tooth of the escapement wheel and the free dog is carried against the stop 103a of the rocking plate by the next tooth of the escapement wheel, allowing the escapement wheel to move one step. Retrograde movement of the escapement wheel is prevented by a spring influenced dog 110 pivoted upon a boss 111 of the base plate 50.

The solenoids 80a to 80f and UC are individually connected by one terminal to respective wipers 120 individually identified by suffixes a, b, c, d, e, f, and UC, and are connected in common by their other terminals to a wiper 121. The wipers ride upon contact bars 122 embedded in an insulating support 123.

*The keyboard*

The selective energization of the solenoids 80a to 80f and UC is controlled by the keyboard 10, the details of which are shown particularly in Figs. 1, 3 and 4. Key levers 125 are pivoted upon a rod 126 supported by a bracket 127 which is fixed to the top of a stepped frame 128. The key bars are individually guided by their front ends in a comb 129 mounted on the frame 128 and are held up against the top of the comb slots by springs 131 anchored to a cross plate of the bracket 127. Below the key bars there is a nested set of bails 130, individually identified by suffixes a, b, c, d, e, f, g, h, i. These bails are supported by pivots 132 on the frame 128 and their cross bars extend across the full width of the keyboard. The key bars 125 are provided with downwardly extending lugs 125x positioned so as to strike the cross bars of bails in combinations individual to each key. These combinations conform to the diagram of Fig. 14, the bails 130a to 130f being associated respectively with the shutter slides 32a to 32f. The keyboard includes a space bar 133, with lugs 125x positioned to operate the bails 130c, 130d, 130e, and 130f. This combination results in a blank setting of the set up unit operated, while actuating the escapement mechanism for a one step movement. The function of the bails 130g to 130i will be explained presently. Beneath the bails are contact operating bars 135 slidably mounted at their front ends in frame members 136, 137 and guided at their rear ends between a plate 139 and a shoulder 144a of a bar of insulating material 144 mounted to the frame 128. The bars 135 are biased toward the front by springs 138 anchored to the bottom edge of the comb 129. The number of slides 135 corresponds to the number of bails 130a to 130i and they are arranged in two groups located under the side arms of the bails. Each bail has a single downwardly extending finger 141 on one of its side arms, engaging in a corresponding slot in the slide 135 associated with it. The finger 141 of the bail 130a is on the right side arm of the bail (lower side arm in the bottom plan view of Fig. 4) and engages the slide 135a, which is the inner one of the right hand group. The finger 141 of the bail 130b is on the left side arm of the bail and engages the slide 135b, which is the inner one of the left hand group. Thus the connections between the bails and the slides alternate from side to side. Each slide carries an insulating piece 142 upon which is mounted a bridging contact member 143. The contact members 143 coact with contact members molded into the bar 144. The bar 144 has the following contact members molded into it: A long contact member 145 having a terminal 145X can be connected by the bridging contact members 143 of the slides 135a to 135f to respective contact members 146a to 146f. The contact 145 can be connected by contact 143 of the slide 135g to a contact 147, which is connected by a wire 148 to a contact 149. The contact 149 can be connected by contact 143 of slide 135h to a contact 150. The contact 145 can be connected by the contact 143 of slide 135i to a contact 151. The circuits completed by these contacts will be described later, by reference to the wiring diagram.

A spring detent 152 on the frame member 136 locks the bail 130i in actuated position, until released by excitation of a solenoid 153.

The photographic recording unit

Referring now to Figs. 1, 2, 12, and 13, the camera 20 is mounted upon the box 19 by its back plate 159, which carries a suitable lens and shutter assembly generally designated 160. 161 designates the shutter trip lever. The back plate 159 also has fixed to it an assembly plate 162, upon which is a stud 163 supporting a spool of film generally designated 164. Shafts 165 and 166 are provided on which are fastened film feed sprockets 167 and 168. Another shaft 169 affords a support for a takeup film spool 170. Shaft 165 has fast to it a ratchet 171 (see Fig. 13) and a driving gear 172. Driving gear 172 is geared to an intermediate gear 173 which in turn is geared to a gear 174 fixed on shaft 166. A suitable belt and pulley drive connection is provided from a pulley 175 fixed to shaft 165, to the takeup spool pulley 176, on shaft 169. Shaft 166 is slotted at this end to receive a winding key generally designated 177 in Fig. 12 and which is normally in inoperative position as shown. Suitably carried by the assembly plate 162 is a shutter and film feed operating solenoid 180. The solenoid 180, when energized, is adapted to throw an actuating member 181 and trip the shutter member 161. 181 is spring restored as shown and upon restoring movement a pawl 182 actuates the film feed to advance a film a line space. A spring detent 183 may be used to prevent retrograde movement of ratchet 171.

Referring again to Fig. 2, within the camera housing there is provided a pivoted film lever 184 which is spring held in contact with the film supply roll. When the film is exhausted, member 184 swings counterclockwise to such an extent that contacts 185, which may be termed the "film lever contacts," open. The camera assembly is provided with a suitably removable housing or cover generally designated 186 in Fig. 13. The removable cover is held in position on the back plate by means of a pair of knurled thumb screws 187. The film, which is provided with the usual feeding sprocket holes and designated 188 in Fig. 12, passes under the first two of a pair of film guides designated 190, thence through a film gate generally designated 191 (see also Fig. 2), thence under another pair of film guides 192. The film guides 190 and 192 and the film gate 191 are mounted on the assembly plate 162.

The camera is first loaded with the cover 186 removed. The cover is then replaced and then upon energization of 180 a section of film is exposed. Upon deenergization of 180, film feed is provided for a line space and a new section of unexposed film is brought to the film gate. When the film is exhausted, the film lever contacts open and the operation stops. The operator then depresses the windup key 177 and winds the remaining section of the film onto the takeup reel 170. The film may then be removed and the camera reloaded.

In the use of a recording machine incorporating the present improvements, each roll of film after exposure would be removed from the recorded unit and then developed. After development, fixing and drying, printed enlargements of any desired size or length can be made as desired. Duplicate copies in any desired number can also be printed. The steps need not be further described as they are all well known.

Verifying window

The shutter 23 (Figs. 2 and 11) of the verifying window 21 is guided for vertical movement in guides 193. Two levers 194 and 195 pivoted at 196 and 197, respectively, have at their extremities pins 198 engaging slots 199 in the shutter 23. The lever 195 is fixed to its pivot shaft 197, which extends through the front wall of the box 19 and has secured to its outer end an operating arm 201. The levers 194 and 195 are interconnected by gear teeth 202 and are normally held with their outer ends in their raised position by a spring 203 (Fig. 1) connected to the operating arm 201. A solenoid 200, when energized, rocks the operating arm 201 counterclockwise and lowers the shutter 23. A button 195a on lever 195 closes contacts 204 when the shutter 23 reaches the bottom limit of its movement. This starts the recording operation, as will be described presently.

Carriage return

The carriage return mechanism is shown particularly in Figs. 1 and 2. This mechanism includes a cam 205 associated with an operating lever 206 and other control mechanism similar to that associated with the cams 66. This mechanism is set in operation by a solenoid 207. The bottom end of actuating lever 206 is pivotally connected by a pin 206a to a bell crank lever 208 pivoted to the frame at 209. The rearwardly extending arm of the bell crank lever lies under a lever 210 pivoted to the frame at 211. The lever 210 has toggle connection through a link 212 to a lever 213 pivoted at 214 to the frame. The upper end of lever 213 bears against a clutch operating member 215 adapted to clutch a spool 216 to the constantly rotating shaft of the roller 70. The spool 216 has wrapped around it a tape 218, which is guided over a roller 219 and hooked to the bottom plate 50 of the carriage 14. Upon excitation of the solenoid 207 the cam 205 is tripped against the roller 70 and makes one revolution, during which the operating lever 206 rocks first counterclockwise and then clockwise. The bell crank lever 208 lifts the toggle lever 210 and engages the clutch of the spool 216. The carriage is pulled to the left, until an operating arm 220 strikes the end of an arm 221 pivoted upon the shaft 211 and connected by a spring 222 to the lever 210. The lever 210 is rocked counterclockwise, breaking the toggle and releasing the clutch of the spool 216.

The pin 206a at the lower extremity of lever 206 has connected to it a link 260, the opposite end of which is articulated at 261 to a rock plate 262 (Fig. 9) pivoted by a stud 263 to the machine frame. A release bar 40, connected by a pin and slot joint 264 to the rock plate 262, has a row of slots 265 through which the downwardly directed ends of the spring detents 38 extend. The release bar 40 makes an excursion to the right each time the carriage return mechanism is operated, to release all the setup units.

Back spacer

The back-spacing mechanism is shown particularly in Figs. 3, 5, 7 and 8. It is operated by a cam 225 coacting with the constantly driven roller 70, upon excitation of a solenoid 226. The cam is mounted upon an operating lever 227 and has control mechanism similar to that pertaining to the cams 68. The operating lever 227 is fixed to a rock shaft 270 pivotally mounted in the frame of the machine. Near the opposite end of shaft 270 is fixed an arm 271 and to the bottom ends of the arm 271 and lever 227 there are pivotally attached links 228 articulated at their rear ends to a universal bar 229 slidably guided in slots 272 in the frame of the machine. The universal bar 229 stands in front of a lug 230a of a lever 230 freely pivoted on shaft 60 which lever engages at its lower end a plate 231 (Figs. 7 and 8) slidably mounted upon studs 232 anchored to the bottom plate 50 of the carriage. The end of lever 230 bears against a bell crank lever 233 pivoted at 234 on the plate 231 and biased in counterclockwise direction (Fig. 8) by a spring 235. Bell crank lever 233 has at its extremity a series of rack teeth 236, which stand ready to engage the spur gear 91. Upon engagement of the back-spacing cam 225 with the roller 70, the lever 230 is thrown to the left (Fig. 3) and first rocks the lever 233 to engage its teeth with the gear 91, then by movement of the plate 231, rotates the gear 91 sufficiently to move the carriage back one space, as the pawl 99 ratchets over ratchet wheel 101. The back-space mechanism is restored to normal position as the cam 225 completes one-half revolution.

Operation and circuit diagram

Figure 15:
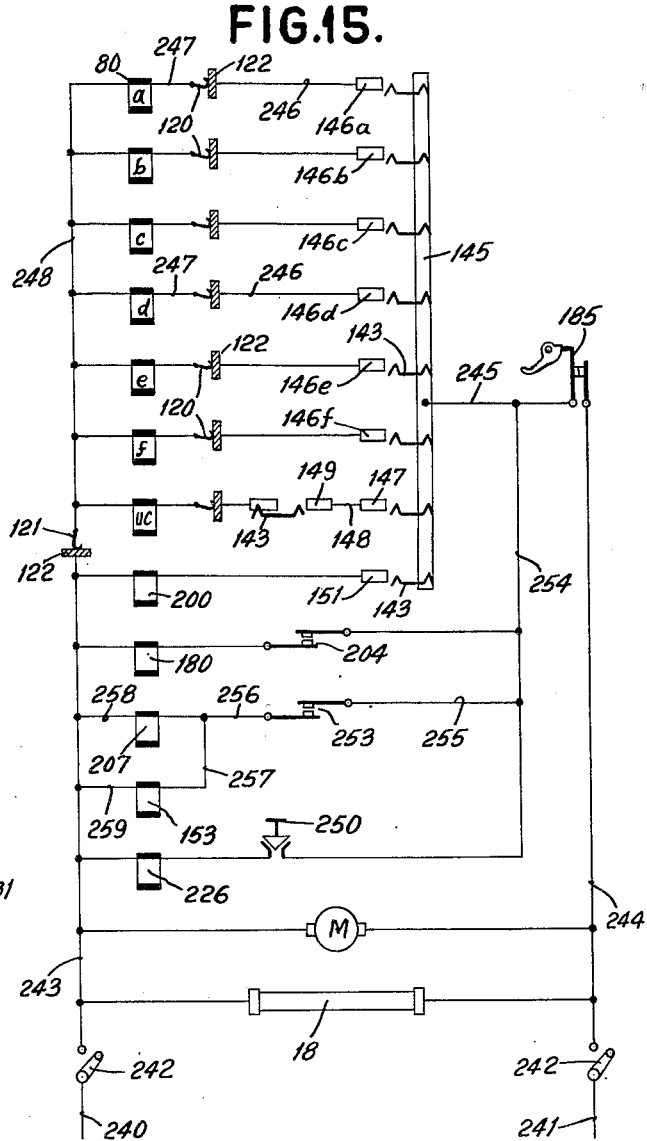
Fig. 15 is a wiring diagram.

Referring now to Fig. 15, the circuits of the machine are supplied from line wires 240 and 241 through switch arms 242 making connection with wires 243 and 244. The lamp 18 is illuminated and the motor M is started. This motor drives the roller 70 through mechanism not disclosed herein, but fully described in Patent No. 2,104,559. When a film is installed in the camera, the contacts 185 are closed, connecting the wire 244 through a wire 245 to the contact bar 145. Now the operation of any one of the character keys will actuate the appropriate bails 130 and move the contact members 143 of the corresponding slides 135 into engagement with the corresponding contacts 146. Circuits will thus be established through wires 246, contact bars 122, wipers 120, wires 247, solenoids 80, wire 248, wiper 121 and the corresponding contact bar 122 to wire 243. The energized solenoids will shift the appropriate shutter slides 32, setting up a character upon the setup unit in front of which the tongues 56 of the interposer slides 53 stand. If the first character is to be an upper case character one of the case shift keys 249 will be operated, shifting the contact member 143 associated with the slide 135g and connecting the contact member 147 to the long contact bar 145. This sets up the contact 149 associated with the slide 135h, which is operated by every character key of the keyboard. A circuit will thus be established through the solenoid UC and the character slide 31 will be set.

The characters are thus set up on the setup mechanism as the keys are operated. In case of error the carriage is returned to operative relation to the setup unit displaying the erroneous character, for instance, by operation of the back-space key 250, which completes an obvious circuit to the back space solenoid 226. The correct key is depressed, automatically releasing the slides of that setup unit which were erroneously set and at the same time setting the correct slides. The characters set up are verified in the window 21, either during the operation of the keys, or when a complete line has been set up. If the line is correct the recording key 251 is operated. Its related bail 130i is locked by the detent 152. The contact member 143 pertaining to the slide 135i is shifted to the contact member 151 and the circuit of the solenoid 200 is completed. Energization of this solenoid closes the shutter of the verifying window in the manner previously described. The arrival of the shutter at closed position is accompanied by closure of contacts 204, energizing the camera shutter operating solenoid 180. At the limit of movement of the shutter operating member 181 is closes a pair of contacts 253, which completes the following circuits: From wire 245, through wires 254 and 255, contacts 253, wires 256 and 257, carriage return solenoid 207 and detent release solenoid 153, and wires 258 and 259 to wire 243. The carriage is returned and the setup mechanism is restored to normal condition.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a photographic recording machine, in combination with a source of light, a plurality of character set-up units positioned side by side, each unit comprising a pack of slides, including a character slide having a complement of trans-illuminable characters thereon, and a plurality of apertured permutation slides between the source of light and said character slide, each permutation slide being individually displaceable longitudinally and the apertures of all the permutation slides of each unit being so positioned that by displacement of the slides of a unit singly and in various combinations every character on the character slide of that unit can be individually exposed to said source of light, through aligned apertures of all the slides of the unit, a screen, means for projecting the images of the illuminated characters on the different character slides simultaneously in a common line upon said screen, while maintaining their original lateral positioning on the character slides, and means for selectively displacing permutation slides in the different units, to expose selected characters.

2. In a photographic recording machine, in combination with a source of light, a plurality of character set-up units positioned side by side, each unit comprising a pack of slides, including a character slide having a complement of trans-illuminable characters thereon, and a plurality of apertured permutation slides between the source of light and said character slide, each permutation slide being individually displaceable longitudinally and the apertures of all the permutation slides of each unit being so positioned that by displacement of the slides of a unit singly and in various combinations every character on the character slide of that unit can be individually exposed to said source of light, through aligned apertures of all the slides of the unit, a screen, means for projecting the images of the illuminated characters on the different character slides simultaneously in a common line upon said screen, while maintaining their original lateral positioning on the character slides, means yieldingly urging each permutation slide toward a normal position, means for selectively displacing permutation slides in the different units to set positions, to expose selected characters, said last means comprising a carriage having a group of setting members thereon for displacing respective permutation slides of any unit opposite which the setting members are positioned by movement of the carriage, a keyboard, means controlled by said keyboard selectively to actuate said setting members, carriage positioning means also controlled by said keyboard, and releasable detent means to hold the displaced slides in set positions.

3. In a photographic recording machine, in combination with a source of light, a plurality of character set-up units positioned side by side, each unit comprising a pack of slides, including a character slide having a complement of transilluminable characters thereon, and a plurality of apertured permutation slides between the source of light and said character slide, each permutation slide being individually displaceable longitudinally and the apertures of all the permutation slides of each unit being so positioned that by displacement of the slides of a unit singly and in various combinations every character on the character slide of that unit can be individually exposed to said source of light, through aligned apertures of all the slides of the unit, a screen, means for projecting the images of the illuminated characters on the different character slides simultaneously in a common line upon said screen while maintaining their original lateral positioning on the character slides, means yieldingly urging each permutation slide toward a normal position, means for selectively displacing permutation slides in the different units to set positions, to expose selected characters, said last means comprising a carriage having a group of setting members thereon for displacing respective permutation slides of any unit opposite which the setting members are positioned by movement of the carriage, a driving roll journaled in stationary bearings on an axis parallel to the movement of said carriage, said setting members having elements associated therewith for coaction with said driving roll to actuate said setting members in any position of said carriage, means including a keyboard for controlling the movement of said carriage and the selective operation of said setting members, and releasable detent means to hold the displaced slides in set positions.

4. In a photographic recording machine, in combination with a source of light, a plurality of character set-up units positioned side by side, each unit comprising a pack of slides, including a character slide having a complement of transilluminable characters thereon, and a plurality of apertured permutation slides between the source of light and said character slide, each permutation slide being individually displaceable longitudinally and the apertures of all the permutation slides of each unit being so positioned that by displacement of the slides of a unit singly and in various combinations every character on the character slide of that unit can be individually exposed to said source of light, through aligned apertures of all the slides of the unit, a screen, means for projecting the images of the illuminated characters on the different character slides simultaneously in a common line upon said screen while maintaining their original lateral positioning on the character slides, means yieldingly urging each permutation slide toward a normal position, means for selectively displacing permutation slides in the different units to set positions, to expose selected characters, said last means comprising a carriage having a group of setting members thereon for displacing respective permutation slides of any unit opposite which the setting members are positioned by movement of the carriage, a keyboard, means controlled by said keyboard selectively to actuate said setting members, carriage positioning means also controlled by said keyboard, and releasable detent means to hold the displaced slides in set position, said detent means being releasable by the setting of another permutation slide of the same unit, whereby an incorrect setting of any character set-up unit can be corrected by moving the carriage to bring the setting members opposite said unit and then operating the correct key of said keyboard.

5. In a photographic recording machine, in combination with a source of light, a plurality of character set-up units positioned side by side, each unit comprising a pack of slides, including a character slide having a complement of transilluminable characters thereon, and a plurality of apertured permutation slides between the source of light and said character slide, each permutation slide being individually displaceable longitudinally and the apertures of all the permutation slides of each unit being so positioned that by displacement of the slides of a unit singly and in various combinations every character on the character slide of that unit can be individually exposed to said source of light, through aligned apertures of all the slides of the unit, a screen, means for projecting the images of the illuminated characters on the different character slides simultaneously in a common line upon said screen while maintaining their original lateral positioning on the character slides, means yieldingly urging each permutation slide toward a normal position, means for selectively displacing permutation slides in the different units to set positions, to expose selected characters, said last means comprising a carriage having thereon a group of actuating members, a group of electromagnets respectively controlling said actuating members, and a group of setting members respectively operated by said actuating members, said setting members being adapted to displace respective permutation slides of any unit opposite which the setting members are positioned by movement of the carriage, a keyboard, means controlled thereby to energize said electromagnets individually or in various combinations, and releasable detent means to hold displaced slides in set positions.

JAMES W. BRYCE.